United States Patent [19]

Chen, Sr. et al.

[11] Patent Number: 4,962,183

[45] Date of Patent: Oct. 9, 1990

[54] POLYIMIDE-POLYAMIDE POLYMER HAVING FLUORINE-CONTAINING LINKING GROUPS

[75] Inventors: Paul N. Chen, Sr., Gillette; Rohitkumar H. Vora, Union County, both of N.J.

[73] Assignee: Hoechst Celanese Corp., Somerville, N.J.

[21] Appl. No.: 348,634

[22] Filed: May 8, 1989

[51] Int. Cl.$^5$ .............................................. C08G 73/14
[52] U.S. Cl. .................................. 528/342; 528/26; 528/27; 528/28; 528/33; 528/125; 528/128; 528/172; 528/188; 528/220; 528/229; 528/337; 528/352; 528/353
[58] Field of Search ............... 528/342, 229, 125, 128, 528/188, 352, 353, 337, 172, 26, 27, 28, 33

[56] References Cited

U.S. PATENT DOCUMENTS 3,179,635  4/1965  Frost et al. ........................... 260/78
4,795,798  1/1989  Tamai et al. ......................... 528/183

FOREIGN PATENT DOCUMENTS 7035557  11/1970  Japan .

*Primary Examiner*—Harold D. Anderson
*Attorney, Agent, or Firm*—Perman & Green

[57] ABSTRACT

The present invention provides novel heat stable polyamide-imide polymers having excellent flow properties and moisture stability which render them more readily processible into fibers, films, sheets and other molded articles. The polymers are prepared by forming the polycondensation product of one or more aromatic diamines, one or more tetrafunctional aromatic dianhydrides, and a difunctional aromatic carboxylic acid or amide-forming derivative thereof containing the groups

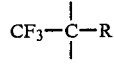

linking two aromatic moieties, wherein R is $CF_3$ or phenyl. In addition to improved flow properties, the polyamide-imide polymers of this invention also exhibit improved solubility properties in most organic solvents, improved resistance to attack by chlorinated solvents such as trichloroethylene as compared with polyimides, improved hydrophobic properties as well as excellent thermal properties, including resistance to thermooxidative degradation.

18 Claims, No Drawings

POLYIMIDE-POLYAMIDE POLYMER HAVING FLUORINE-CONTAINING LINKING GROUPS

BACKGROUND OF THE INVENTION

1. Field of the Invention

The present invention relates to aromatic polyimide-polyamide polymers containing the hexafluoroisopropylidine or the 1-phenyl-2,2,2-trifluoroethane linking group having improved physical and chemical properties, and to a method for preparing such polymers.

2. Description of Related Art

Polyamide-imide polymers and copolymers are known in the art. These materials may be prepared by the condensation polymerization of trifunctional acid monomers such as the 4-acid chloride of trimellitic anhydride and one or more aromatic diamines. Examples of such polymers are disclosed in U.S. Pat. Nos. 3,347,828, 3,494,890, 3,661,832 and 3,920,612. These polymers may be characterized by extremely good high temperature properties (Tg of about 275° C. or higher), good high temperature stability, good tensile strength at high temperatures, good mechanical properties and good chemical resistance. These polyamide-imides are useful as wire enamel coatings, laminates, molded products, films, fibers; impregnating varnishes and in other applications where high thermal stability is required.

Polyimide-polyamide polymers may also be prepared by reacting an aromatic diacid chloride, an aromatic diamine and an aromatic dianhydride as disclosed for example in U.S. Pat. No. 3,179,635.

One of the problems associated with such polymers is that they exhibit generally poor flow properties which render them difficult to process, particularly to injection mold or to spin into fibers. These polymers are also relatively hydrophilic and tend to absorb moisture which can effect their clarity, heat stability, processability, mechanical and electrical properties. Many of these polymers are also insoluble in organic solvents which renders them less suitable in film casting and fiber spinning applications and for the production of composites.

Attempts have been made in the art to improve the flow properties of polyamide-imide polymers. For example, U.S. Pat. No. 4,448,925 discloses including from about 1 to about 10 percent phthalic anhydride into the polymerization recipe to provide polyamide-imide copolymers having improved flow properties. However, this technique for improving flow properties is made at the expense of the heat stability and chemical resistance of the polymer. Yet another method for improving the flow properties of such polymers is to form blends thereof with up to about 10% by weight of a polyamide such as nylon 6 or nylon 66, as disclosed in U.S. Pat. No. 4,575,924. Once again however, such an approach to solving the flow problem is made at the expense of the thermal stability and optical clarity of the resultant polymer blend.

SUMMARY OF THE INVENTION

The present invention provides novel heat stable polyimide-polyamide polymers having excellent flow properties and moisture stability which render them more readily processible into fibers, films, sheets and other molded articles. The polymers are prepared by forming the polycondensation product of one or more aromatic diamines, one or more tetrafunctional aromatic dianhydrides, and a difunctional aromatic carboxylic acid or amide-forming derivative thereof containing the groups

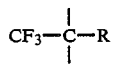

linking two aromatic moieties, wherein R is $CF_3$ or phenyl. In addition to improved flow properties, the polyimide-polyamide polymers of this invention also exhibit improved solubility properties in most organic solvents, improved resistance to attack by chlorinated solvents such as trichloroethylene as compared with polyimides, improved hydrophobic properties as well as excellent thermal properties, including resistance to thermooxidative degradation.

DETAILED DESCRIPTION OF THE INVENTION

The polyimide-polyamide polymers of the present invention (hereinafter referred to as PI-PA polymers) may be characterized as including structural units of the formula:

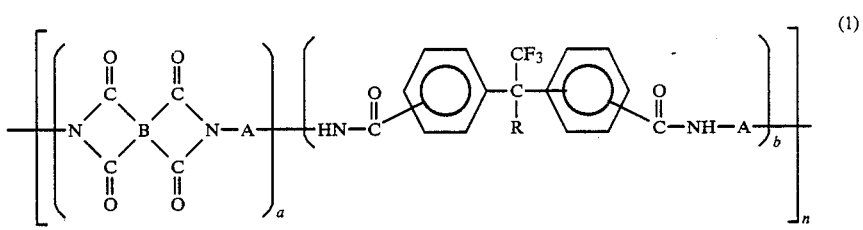

wherein the terms (a) and (b) are equal to the mole fraction of each recurring unit in the polymer chain and (a) ranges from about 0.05 to about 0.95, (b) ranges from about 0.95 to about 0.05, with the proviso that the sum of (a) and (b) is equal to 1.00, n is a number sufficient to give rise to a PI-PA inherent viscosity of at least about 0.05 as measured from a solution of the polymer in dimethyl acetamide at 25° C. at a polymer concentration of 0.5 weight percent, A is a divalent aromatic moiety, and B is a tetravalent aromatic organic radical wherein each pair of carbonyl groups are attached to adjacent carbon atoms in the ring moiety B.

Preferably, B in formula 1 comprises a phenylene, naphthalene or a bis-phenylene type compound, or a mixture of such compounds, all of which may be unsubstituted or substituted with halogen, hydroxy, lower $C_1$ to $C_6$ alkyl or lower $C_1$–$C_6$ alkoxy groups, n is a number sufficient to provide an inherent viscosity of at least about 0.1 dl/g as measured from a solution of the polymer in dimethylacetamide at 25° C. at a polymer concentration of 0.5 weight percent, and R is $CF_3$.

Illustrative of tetracarboxylic acid dianhydrides which are suitable for use in the present invention includes:
1,2,3,4-benzene tetracarboxylic acid dianhydride;
1,4-bis(2,3-dicarboxyphenoxy) benzene dianhydride;
1,3-bis(3,4-dicarboxyphenoxy) benzene dianhydride;
1,2,4,5-naphthalene tetracarboxylic acid dianhydride;
1,2,5,6-naphthalene tetracarboxylic acid dianhydride;
1,4,5,8-naphthalene tetracarboxylic acid dianhydride;
1,2,4,5-benzene tetracarboxylic acid dianhydride;
2,3,6,7-naphthalene tetracarboxylic acid dianhydride;
2,6-dichloronaphthalene-1,4,5,8-tetracarboxylic acid dianhydride;
2,7-dichloronaphthalene-1,4,5,8-tetracarboxylic acid dianhydride;
2,3,6,7-tetrachloronaphthalene-1,4,5,8-tetracarboxylic acid dianhydride;
3,3',4,4'-diphenyl tetracarboxylic acid dianhydride;
2,2',3,3'-diphenyl tetracarboxylic acid dianhydride;
4,4'-bis(3,4-dicarboxyphenoxy)diphenyl dianhydride;
bis(2,3-dicarboxyphenyl) ether dianhydride;
4,4'-bis(2,3-dicarboxyphenoxy) diphenyl ether dianhydride;
4,4'-bis(3,4-dicarboxyphenoxy) diphenyl ether dianhydride;
bis(3,4-dicarboxyphenyl) sulfide dianhydride;
4,4'-bis(2,3-dicarboxyphenoxy) diphenyl sulfide dianhydride;
4,4'-bis(3,4-dicarboxyphenoxy) diphenyl sulfide dianhydride;
bis(3,4-dicarboxyphenyl) sulfone dianhydride;
4,4'-bis(2,3-dicarboxyphenoxy) diphenyl sulfone dianhydride;
4,4'-bis(3,4-dicarboxyphenoxy) diphenyl sulfone dianhydride;
3,3',4,4'-benzophenone tetracarboxylic acid dianhydride;
2,2',3,3'-benzophenone tetracarboxylic acid dianhydride;
2,3,3'4'-benzophenone tetracarboxylic acid dianhydride;
4,4'-bis(3,4-dicarboxyphenoxy) benzophenone dianhydride;
bis(2,3-dicarboxyphenyl) methane dianhydride;
bis(3,4-dicarboxyphenyl) methane dianhydride;
1,1-bis(2,3-dicarboxyphenyl) ethane dianhydride;
1,1-bis(3,4-dicarboxyphenyl) ethane dianhydride;
1,2-bis(3,4-dicarboxyphenyl) ethane dianhydride;
2,2-bis(2,3-dicarboxyphenyl) propane dianhydride;
2,2-bis(3,4-dicarboxyphenyl) propane dianhydride;
2,2-bis[4-(2,3-dicarboxyphenoxy) phenyl] propane dianhydride;
2,2-bis[4-(3,4-dicarboxyphenoxy) phenyl] propane dianhydride;
4-(2,3-dicarboxyphenoxy)-4'-(3,4-dicarboxyphenoxy) diphenyl-2,2-propane dianhydride;
2,2-bis[4-(3,4-dicarboxyphenoxy-3,5-dimethyl) phenyl] propane dianhydride;
2,3,4,5-thiophene tetracarboxylic acid dianhydride;
2,3,4,5-pyrrolidine tetracarboxylic acid dianhydride;
2,3,5,6-pyrazine tetracarboxylic acid dianhydride;
1,8,9,10-phenanthrene tetracarboxylic acid dianhydride;
3,4,9,10-perylene tetracarboxylic acid dianhydride;
2,2-bis(3,4-dicarboxyphenyl) hexafluoropropane dianhydride;
1,3-bis(3,4-dicarboxyphenyl) hexafluoropropane dianhydride;
1,1-bis(3,4-dicarboxyphenyl)-1-phenyl-2,2,2-trifluoroethane dianhydride;
2,2-bis[4-(3,4-dicarboxyphenoxy) phenyl] hexafluoropropane dianhydride;
1,1-bis[4-(3,4-dicarboxyphenoxy) phenyl]-1-phenyl-2,2,2-trifluoroethane dianhydride; and
4,4'-bis[2-(3,4-dicarboxyphenyl)hexafluoroisopropyl] diphenyl ether dianhydride;
bis[2-(4-carboxyphenyl) hexafluoroisopropyl] diphenyl ether dianhydride; and mixtures thereof.

With respect to PI-PA polymers of formula 1, B is preferably the the tetravalent residuum of either 2,2-bis(3,4-di-carboxyphenyl) hexafluoropropane dianhydride, 1,3-bis (3,4-dicarboxyphenyl) hexafluoropropane dianhydride, 2,2-bis[4-(3,4-dicarboxyphenoxy)phenyl] hexafluoropropane dianhydride, 1,1-bis(3,4-dicarboxyphenyl)-1-phenyl-2,2,2-trifluoroethane dianhydride, 1,1-bis[4(3,4-dicarboxyphenyl) phenyl]-1-phenyl-2,2,2-trifluoroethane dianhydride, or 4,4-bis[2-(3,4-dicarboxyphenyl) hexafluoroisopropyl] diphenyl ether dianhydride.

In the PI-PA polymers of formula 1, A may be the divalent residuum of one or a combination of aromatic diamines having the formula:

$$NH_2—D—NH_2 \qquad (2)$$

wherein D is the aromatic moiety of a phenylene, naphthalene, bis or polyphenylene type compound. D is preferably selected from:

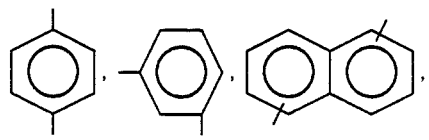

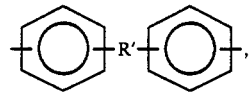

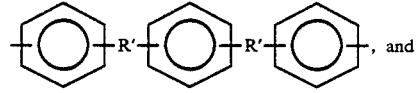

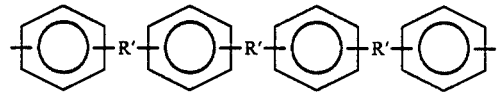

wherein R' is a divalent moiety independently selected from a covalent carbon to carbon bond, methylene, ethylene, propylene, isopropylene, hexafluoroisopropylidene, 1-phenyl-2,2,2-trifluoroethylidene, dichloro and difluoroalkylenes up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene up to 8 Si atoms disiloxanylene, and a polysiloxanylene up to 8 Si atoms. Preferably, the linking group R' is selected from oxy, hexafluoroisopropylidene, 1-phenyl-2,2,2-trifluoroethylidene, carbonyl, methylene, a covalent carbon to carbon bond, disiloxanylene and polysiloxanylenes. Most preferably, R' is a carbon to carbon bond, methylene, hexafluoroisopropylidene, 1-phenyl-2,2,2-trifluoroethylidene and oxy.

The hydrogen atoms of the aromatic groups A and/or B may be substituted by one or more non-interfering monovalent substituents such as chloro, fluoro, lower alkyl or alkoxy having up to 6 carbon atoms, and phenyl. Also, the term "aromatic" as used herein is meant to include heteroaromatics wherein one or more of the ring atoms is replaced with —O—, —S— or —N— atoms.

Divalent diamine monomers which may be used in preparing the PI-PA polymers of the present invention include:
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl)sulfone;
bis(4-aminophenyl) sulfone;
4,4'-diamino-dibenzyl sulfoxide;
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1 5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxyl)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2-(3-aminophenyl)-2-(4-aminophenyl) hexafluoropropane;
2,2-bis[4-(4-aminophenoxy)phenyl] hexafluoropropane;
2,2-bis[4-(2-chloro-4-aminophenoxy)phenyl] hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluorothane;
1,4-bis(3-aminophenyl)buta-1-ene-3-yne;
1,3-bis(3-aminophenyl) hexafluoropropane;
1,5-bis(3-aminophenyl) decafluoropentane;
2-(3-aminophenyl)-2-(4-aminophenyl)hexafluoropropane;
2,2-bis(3-amino-4-methylphenyl)hexafluoropropane;
2,2-bis(4-amino-3-methylphenyl)hexafluoropropane;
2,2-bis(3-amino-4,5-dimethylphenyl)hexafluoropropane;
2,2-bis(4-amino-3,5-dimethylphenyl)hexafluoropropane; and mixtures thereof.

The third monomeric component used in preparing the polymers of this invention is a dicarboxylic acid or amide-forming derviative thereof having the formula:

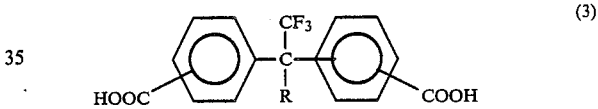
(3)

wherein R is CF$_3$ or phenyl. Suitable such dicarboxylic acid derivatives include the acid halide, preferably the acid chloride, or lower alkyl or phenyl esters thereof.

Preferred of such dicarboxylic acid monomers are the acid halide derivatives of 2,2-bis(4-carboxyphenyl)hexafluoropropane, 2,2-bis(3-carboxyphenyl)hexafluoropropane, and 1,1-bis(4-carboxyphenyl)-1-phenyl-2,2,2-trifluoroethane.

The polymers of this invention may also be prepared using a monomer mixture of the fluorine-containing aromatic diacid or derivative set forth above and one or more different diacids or derivatives thereof, preferably an aromatic dicarboxylic acid halide. Typical acid halides useful in such mixtures may be represented by the following formula:

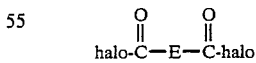

wherein E represents a divalent alkylene, alicyclic or aromatic moiety, preferably an aromatic moiety selected from:

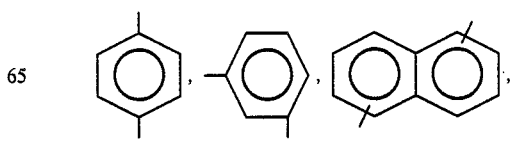

-continued

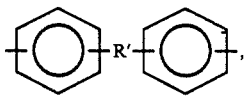

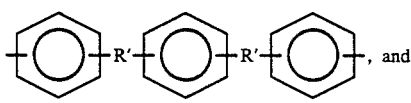

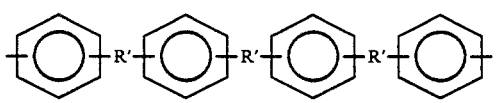

wherein R' is a divalent moiety independently selected from a covalent carbon to carbon bond, methylene, ethylene, propylene, isopropylene, dichloro and difluoroalkylenes up to 3 carbons, 1-phenyl-2,2,2-trichloroethylidene, oxy, thio, sulfinyl, sulfonyl, sulfonamido, carbonyl, oxydicarbonyl, oxydimethylene, sulfonyldioxy, carbonyldioxy, silanylene, disilanylene, polysilanylene up to 8 Si atoms; siloxanylene, disiloxanylene, and a polysiloxanylene up to 8 Si atoms. Preferably, the linking group R' is selected from oxy, carbonyl, methylene, a covalent carbon to carbon bond, siloxanylene, disiloxanylene and polysiloxanylenes, most preferably, methylene and oxy.

The hydrogen atoms of the linking group E and/or R' may be substituted by non-interfering monovalent substituents such as chloro, fluoro, lower alkyl up to 6 carbons and phenyl. Also as used herein, the terms "aromatic" and "alicyclic" are meant to include heteroaromatics and heteroalicyclics wherein one or more of ring carbon atoms have been replaced with —O—, —S—, or —N— atoms.

Illustrative acid halides of aromatic dicarboxylic acids useful in such mixtures include the acid chlorides of:
isophthalic acid;
phthalic acid;
terephthalic acid;
1,4-phenylenediethanoic acid;
3,3'-biphenyl dicarboxylic acid;
4,4'-biphenyl dicarboxylic acid;
3,3'-dicarboxy diphenyl ether;
4,4'-dicarboxy diphenyl ether;
bis-(4-carboxyphenyl) methane;
bis-(4-carboxyphenyl)-methly phosphane oxide;
bis-(3-carboxyphenyl)-sulfone;
4,4'-dicarboxytetraphenylsilane;
bis(3-carboxyphenyl)-sulfone;
bis(4-carboxyphenyl)-sulfone;
5-tertiary butyl isophthalic acid;
5-bromoisophthalic acid;
5-fluoro-isophthalic acid;
5-chloroisophthalic acid;
2,2-bis-(3-carboxyphenyl) propane;
2,2-bis-(4-carboxyphenyl) propane;
4,4'-(p-phenylenedioxy) dibenzoic acid;
2,6-naphthalene dicarboxylic acid;
4,4'-para-phenylenedioxy dibenzoic acid;
4,4'-bis[2-(4-carboxyphenyl) hexafluoroisopropyl] diphenyl ether;
bis(3-carboxyphenyl) sulfide;
bis(4-carboxyphenyl) sulfide;
1,4-phenylene diethanoic acid;
1,4-bis(4-carboxyphenoxy) phenylene;
2,2-bis[4-(4-carboxyphenoxy) phenyl] hexafluoropropane;
1,1-bis[4-(4-carboxyphenoxy) phenyl]-1-phenyl-2,2,2-trifluoroethane;
and mixtures thereof.

The moiety E may also be selected from an alkylene moiety having from one to twenty carbons or an alicyclic moiety of four to eighteen carbons. Illustrative compounds of this class of dicarboxylic acid halides include those of the following dicarboxylic acids:
1,4-cyclohexane dicarboxylic acid:
1,3-cyclopentane dicarboxylic acid;
oxalic acid;
1,2-cyclobutane dicarboxylic acid;
1,4-cyclohexane diacetic acid;
malonic acid;
pentanedioic acid;
hexanedioic acid;
2,4-furandicarboxylic acid;
1,10-decanedicarboxylic acid;
1,12-dodecanedicarboxylic acid;
succinic acid;
1,18-octadecanedicarboxylic acid;
glutaric acid;
2,6-cyclohexane dipropionic acid;
adipic acid;
2,6-cyclohexane dihexanoic acid;
and mixtures thereof.

The PI-PA polymers of this invention may be based 100 mole % on fluorine-containing monomers as in the case of polymers of formula 1 wherein both the A and B moieties are based on fluorine-containing residuums contained in the aromatic dianhydride and diamine reactants. More preferably, however, the polymers contain from about 25 to about 100 mole percent of fluorine containing monomers and most preferably from about 50 to about 75 mole percent of fluorine containing monomers, based on the total weight of diacid, dianhydride and amino monomers present in the polymer.

The diacid, dianhydride and diamine reactants, particularly those containing fluorine, are preferably substantially electronically pure and are referred to as electronic grade monomers. They generally should be at least about 98.5% pure, and more preferably at least about 99.5% pure.

The PI-PA of the present invention are preferably prepared by a solution polymerization process, i.e., by reacting diacid chloride, dianhydride and diamine monomers in an appropriate solvent, optionally in the presence of a catalyst or an added inorganic salt such as lithium chloride or calcium chloride, and in a nitrogen atmosphere. Polymerization is conducted under anhydrous, isothermal polymerization conditions and preferably at a temperature of less than 35° C. The intermediate polyamide-polyamic acid reaction product is then cyclized to form the imide linkage either by chemical dehydration or by an appropriate heat treatment. The polymer may be recovered by precipitation in water or an alcohol such as methanol, and washed.

The solvents useful in the solution polymerization process for synthesizing the polymers are the organic solvents whose functional groups do not react with the reactants to any appreciable extent. In addition to being inert to the system, and preferably, being a solvent for the polymer, the organic solvent must be a solvent for at least one of the reactants, preferably for all of the reactants. The normally liquid organic solvents of the N,N,dialkylcarboxylamide class are useful as solvents in the process. The preferred solvents are the lower molecular weight members of this class, particularly N,N-dimethylformamide and N,N-dimethyl-acetamide. Other useful solvents are N,N-diethyl-formamide, N,N-diethylacetamide, N,N-dimethylmethoxy-acetamide, N-methyl caprolactam, and the like. Other solvents which may be used include dimethylsulfoxide. N-methyl-2-pyrrolidone, tetramethyl urea, pyridine, dimethylsulfone, hexamethylphosphoramide, tetramethy-lene sulfone, formamide, N-methylformamide, butyro-lactone and phenols such as m-cresol. The solvents can be used alone or in combinations.

To obtain the maximum inherent viscosity, i.e., maximum degree of polymerization, for any particular combination of monomers, solvent, etc., and thus produce shaped articles such as films and filaments of optimum toughness, it has been found that the temperature throughout the reaction should be maintained below 50° C., preferably below about 35° C.

The degree of polymerization of the PI-PA polymer is subject to deliberate control. The use of equimolar amounts of the acidic and amino reactants under the prescribed conditions provides polymers of very high molecular weight. The use of either the acid or amino reactants in large excess limits the extent of polymerization. In addition to using an excess of a reactant to limit the molecular weight of the polymer, a chain terminating agent such as phthalic anhydride may be used to "cap" the ends of the polymer chains. Typical useful capping agents are monoanhydrides or monoamines such as phthalic anhydride, aniline or p-methylaniline.

In the preparation of the PI-PA polymers, it is desired that the molecular weight be such that the inherent viscosity of the polymer is at least about 0.1, more preferably from about 0.2 to about 2.0. The inherent viscosity is measured at 25° C. at a concentration of 0.5% by weight of the polymer in a suitable solvent such as dimethylacetamide.

The quantity of organic solvent used in the process need only be sufficient to dissolve enough of one reactant, preferably the diamine, to initiate the reaction of the diamine and the other monomers. It has been found that the most successful results are obtained when the solvent represents at least 60% of the final solution, that is, the solution should contain 0.05–40% of the polymeric component, more preferably 10 to 25%.

The second step of the process (dehydration) is performed by treating the polyamide-polyamic acid with a dehydrating agent alone or in combination with a tertiary amine such as acetic anhydride or a mixture of acetic anhydride and pyridine or beta picoline. The ratio of acetic anhydride to tertiary amine can vary from just above zero to infinite mixtures.

Tertiary amines having approximately the same activity as the preferred pyridine or beta picoline can be used in the process. These include isoquinoline, 3,4-lutidine, 3,5-lutidine, 4-methyl pyridine, 3-methyl pyridine, 4-isopropyl pyridine, N,N-dimethyl benzyl amine, 4-benzyl pyridine, and N,N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethylpyridine, 2-methyl pyridine, triethyl amine, N-ethyl morpholine, N-methyl morpholine, diethyl cyclohexylamine, N,N-dimethyl cyclohexylamine, 4-benzoyl pyridine, 2,4-lutidine, 2,6-lutidine and 2,4,6-collidine, and are generally used in larger amounts.

An alternative method for the preparation of the PI-PA polymers is the thermal dehydration of the intermediate polyamide-polyamic acid. This transformation is generally performed in bulk, preferably in the form of a shaped article, e.g., film or filament of the polymamic acid. The dehydration is conducted stepwise starting at temperatures of about 100° C. and increasing the temperature progressively to about 300° C. or even higher, depending on the particular case, towards the end of the imidization step. The reaction is preferably performed under an inert atmosphere, and atmospheric or reduced pressures can be employed.

The PI-PA polymers of the present invention generally have a weight average molecular weight ($M_w$) within the range of from about 5,000 to about 200,000 or more.

The following examples are illustrative of the invention:

EXAMPLE 1

This example details the preparation of a polyimide-polyamide having the structure of formula 1 above and based on the reaction product of 0.01 moles of methylene dianiline (MDA), 0.005 moles of 2,2-bis (4-chlorocarbonylphenyl) hexafluoropropane (6F-Diacid chloride) and 0.005 moles of 2,2-bis (3,4-dicarboxyphenyl) hexafluoropropane dianhydride (6F-Dianhydride) to yield a polymer containing about 25 mole percent of the residuum of 6F-diacid chloride based on the total monomer content.

A 250 ml 3 neck flask, fitted with a stirrer, condenser, Y tubes, powder addition funnel, thermometer, dry ice-acetone cooling bath and nitrogen blanket was charged under nitrogen atmosphere with 1.98 grams (0.01 moles) of MDA along with 46 grams of reagent grade dimethyl acetamide (DMAC). The mixture was stirred to dissolve the MDA and cooled down to a temperature of about −10° C. The 6F-Diacid chloride and 6F-Dianhydride were separately blended in a ratio of 2.145 g of 6F-Diacid chloride (0.005 moles) and 2.22 grams of 6F-Dianhydride (0.005 moles) and ½ of this blend was gradually added to the solution of MDA in DMAC over a period of about 25 minutes time while continuing agitation and maintaining a temperature of about 10° C. under nitrogen atmosphere. The remainder of the blend was then gradually added over about 39 minutes time while continuing agitation at about −12° C. under nitrogen atmosphere. The beaker containing the blend was rinsed with 6 grams of additional DMAC and this was also added to the polymerization solution, and agitation continued for 30 minutes. The temperature of the solution was allowed to rise to 8° C. and 1.12 grams (0.011 mole) of triethylamine was charged dropwise over about 5 minutes time under nitrogen atmosphere while continuing agitation. Thereafter 6 grams of DMAC was charged under nitrogen and the reaction mass was agitated at a temperature within the range of 6°–10° C. for 160 minutes. Thereafter, 3.8 grams of pyridine and 5.4 grams of acetic anhydride was charged under nitrogen atmosphere and the reaction mass was then allowed to agitate for about 12 hours at room temperature to complete cyclization. The reaction mass was then filtered to remove pyrridine hydrochloride. The polymer formed above was precipitated from solution in methanol by the addition of methanol to the reaction liquor, that is by reverse precipitation, using about 2000 ml of methanol for every 500 grams of polymeric solution. The resulting polymer was then washed with water and methanol, and chopped to a fine powder as an aqueous suspension in a mechanical blender. The powder was dried overnight in a vacuum oven at 60° C.

This polymer has the following structural statistical formula:

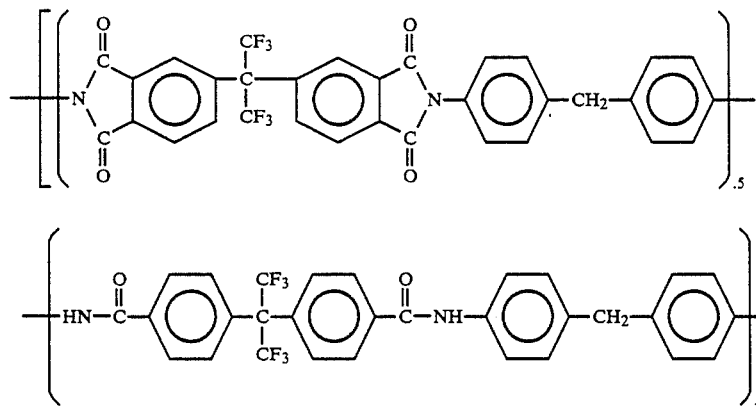

EXAMPLE 2

This example sets forth the preparation of a polyimide-polyamide having the structure of formula 1 above based on the reaction product of 0.01 moles of oxydianiline (ODA), 0.005 moles of 6F-Diacid chloride and 0.005 moles of 6F-Dianhydride.

The procedure of Example 1 was repeated but the following materials and quantities were employed:

| | |
|---|---|
| ODA | 2.00 grams |
| 6F-Diacid chloride | 2.15 grams |
| 6F-Dianhydride | 2.22 grams |
| DMAC | 58.00 grams |
| Pyridine | 3.80 grams |
| Triethylamine | 1.12 grams |
| Acetic Anhydride | 5.42 grams |

Polymerization was conducted and sequential addition of the above reactants and materials and polymer recovery were as set forth in Example 1. 5.4 grams of a light green polymer in powdered form was obtained. This polymer has the same structure as the polymer prepared in Example 1 except for the substitution of the methylene linkage with an oxygen linkage.

Properties of the PI-PA polymers prepared in accordance with Examples 1 and 2 appears in Table 1.

pump, chromatography columns with heater, and a differential refractometer connected to a Shimadzu CR 30A data reduction system with accompanying software (version 1.1, Shimadzu part No. T/N 22301309-91). The refractometer used was a Waters model 410 and four chromatography columns, 500 Angstron, 1000 Angstron, 10,000 Angstron and 100,000 Angstron (available from Waters) were connected in series. The system was calibrated using multiple available polystyrene standards ranging in molecular weight as follows:

| GPC CALIBRATION | |
|---|---|
| Calibration Standard (Polystryene) | Mol. Wt. |
| 1 | 470,000 |
| 2 | 170,000 |
| 3 | 68,000 |
| 4 | 34,500 |
| 5 | 9,200 |
| 6 | 3,200 |
| 7 | 1,250 |

The standards are essentially monodisperse, consisting substantially of a single molecular weight. With the system thus calibrated, the relative (relative to polystyrene standards) weight average molecular weight $M_w$, the relative number average molecular weight $M_n$, and polydispersity (d), $M_w/M_n$ were obtained for polymers produced in accordance with the Examples given hereinabove.

Glass transition temperatures (Tg) were determined by differential scanning calorimetry using a Perkin Elmer DSC-4 calorimeter operating at 20° C./min., nitrogen atmosphere at 60 cc/min. Glass transition temperature by this method is generally defined as the point of intersection of tangent lines about the point of first inflection of the heating curve of the polymer. Thermogravimetric analysis (TGA) was performed with a Perkin Elmer 65-2 analyzer at 20° C./min. with an air rate of 80 cc/min. TGA values given herein are for five

TABLE 1

| Example | 6F-Diacid chloride mole % (acid side) | 6F-Dianhydride mole % (acid side) | Diamines mol % | Inherent Viscosity dl/gm | GPC Mw | Mn | Mw/Mn | DSC Tg deg. C. | TGA 5% wt. los deg. C. |
|---|---|---|---|---|---|---|---|---|---|
| 1 | 50 | 50 | 100 (MDA) | 0.36 | 47869 | 24644 | 1.9 | 298 | 500 |
| 2 | 50 | 50 | 100 (ODA) | 0.68 | 89976 | 44352 | 2.0 | 303 | 480 |

The weight average molecular weight ($M_w$) and number average molecular weight ($M_n$) of the polymers described above were measured by gel permeation chromatography (GPC) performed on dilute solutions of the polymer in tetrahydrofuran (THF). The actual apparatus employed consisted of a Waters (Millipore Corp.) programmable automatic sampler, vacuum percent weight loss; in other words, the temperature at which 5% weight loss is observed is reported.

As is evident from the data in Table 1, the PI-PA polymers of the present invention have Tg values in the order of 300° C. or more while at the same time exhibiting improved flow properties and injection molding properties. Thus, the flow properties of the polymers of this invention are markedly improved without significant sacrifice of the glass transition temperature (Tg).

EXAMPLE 3

The flow properties of the polymers of this invention and as a control, a commercially available polyamide-imide sold by Amoco under its Trade Name Torlon® 4203L may be compared by forming compression molded discs of each polymer type. Discs of approximately 1 inch diameter are prepared using a hot press and piston cylinder mold to form the molded discs. Approximately ½ inch of polymer in powder form is sprinkled into the bottom of a mold piston and the piston inserted between the pallets of a hot press and heated to 300° C. After coming to temperature, a pressure of 2000 psi is applied to the piston for 3 minutes. The pressure is then released, the mold cooled and the molded polymer disc having a thickness of about 20 mil is removed from the mold. Each of the polymers of Examples 1 and 2 produced a clear, transparent, disc having good flexural properties. The control disc was in the form of compressed, fused yellow green pellets.

The PI-PA polymers of the present invention may be used in their preimidized form (polyamide-polyamic acid) as solutions in organic solvent to produce films, coatings, composites and the like which may be cured in-situ to form the imide linkage by the application of heat.

The PI-PA polymers may be molded using techniques such as compression molding or injection molding to produce melt fabricated articles such as fibers, films, safety masks, windshields, electronic circuit substrates, airplane windows or the like. Shaping may be accomplished by subjecting the polymer to temperatures of at least about 300° C. and a pressure of at least about 500 psi. They may be compounded with graphite, graphite fiber, molybdenum disulphide or PTFE for the production of self- lubricating wear surfaces useful for piston rings, valve seats, bearings and seals. They may also be compounded with fibers such as glass, graphite or boron fibers to produce molding compounds for high strength structural components such as jet engine components. The polymers may also be compounded with friction materials to produce molding compounds for high temperature braking components or with abrasive materials such as diamonds for high speed grinding wheels.

The polymers may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wear coatings, and photoresist coatings useful in microelectronic processing.

The polymers may also be used to produce high temperature adhesives for bonding aerospace structures or electrical circuitry, conductive adhesives when mixed with conductive fillers such as silver or gold for microelectronic applications, or adhesives for glass, metal or plastic substrates.

The PI-PA polymers may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

In general, the PI-PA polymers and polyamic-acid precursors of this invention may be used in all applications as disclosed in copending application Ser. No. 124,704, filed in the U.S. Patent and Trademark Office on Nov. 24, 1987, the disclosure of which application is incorporated herein by reference.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A polyimide-polyamide polymer containing at least one recurring structural unit of the formula:

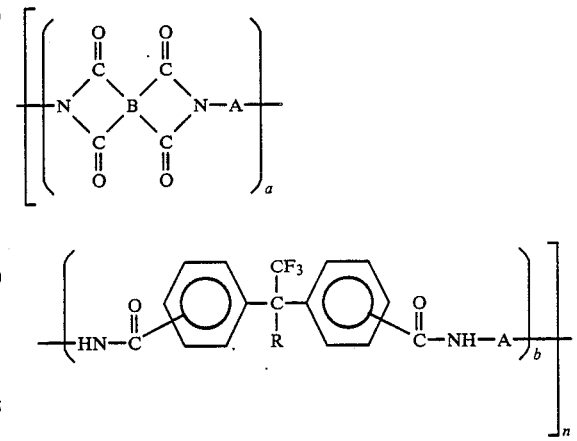

wherein n is a number corresponding to a polymer inherent viscosity of at least about 0.1 as measured from a solution of the polymer in dimethylacetamide at 25° C. at a polymer concentration of 0.5 weight percent, A is a divalent aromatic moiety, B is a tetravalent aromatic organic radical wherein each pair of carbonyl groups are attached to adjacent carbon atoms in the ring moiety B, R is $CF_3$ or phenyl, and the terms a and b are equal to the mole fraction of each recurring unit in the polymer chain and a ranges from about 0.05 to about 0.95, b ranges from about 0.95 to about 0.05, with the proviso that the sum of a and b is equal to 1.00.

2. The polymer of claim wherein A is selected from the group consisting of phenylene, naphthalene, a bis-phenylene and mixtures thereof, which is unsubstituted or ring substituted with a radical selected from the group consisting of halogen, hydroxy, lower $C_1$ to $C_6$ alkyl and lower $C_1$ to $C_6$ alkoxy.

3. The polymer of claim 1 prepared by forming the polymer condensation product of a diacid halide, an aromatic diamine and an aromatic dianhydride, and imidizing the resulting amide-acid condensation product.

4. The polymer of claim 3 wherein said aromatic dianhydride is selected from the group consisting of bis (3,4-dicarboxyphenyl) ether dianhydride, 3,3'4,4' benzophenone tetracarboxylic dianhydride, 3,3',4,4'-diphenyl tetracarboxylic acid dianhydride, 2,2-bis (3,4 dicarboxy phenyl) hexafluoropropane dianhydride, 1,2,4,5-benzene tetracarboxylic acid dianhydride, 4,4'-bis[2-(3,4-dicarboxyphenyl)hexafluoroisopropyl] diphenyl ether dianhydride, and mixtures thereof.

5. The polymer of claim 3 wherein R is CF$_3$.

6. The polymer of claim 3 wherein said diacid halide is selected from the group consisting of the acid halide derivatives of 2,2-bis(4-carboxyphenyl)hexafluoropropane, 2,2-bis(3-carboxyphenyl)hexafluoropropane, and 1,1-bis(4-carboxyphenyl)-2,2,2,-trifluoroethane.

7. The polymer of claim 3 wherein said aromatic diamine is a diaryl diamine having the formula:

Ti NH$_2$—D—NH$_2$ wherein D is the aromatic moiety of a phenylene, naphthalene, bis or polyphenylene compound.

8. The polymer of claim 7 wherein said diamine is methylene dianiline.

9. The polymer of claim 7 wherein said diamine is oxydianiline.

10. The polymer of claim 4 wherein said diacid halide is 2,2-bis(4-carboxyphenyl)hexafluoropropane.

11. The polymer of claim 1 having at least one repeating unit of the structure:

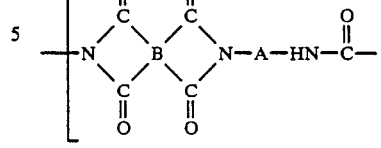

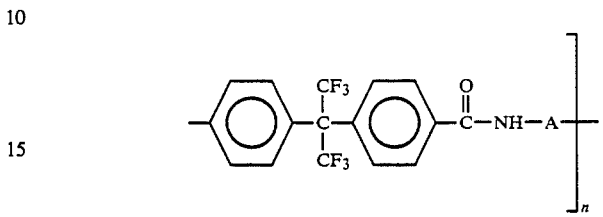

12. The polymer of claim 11 wherein A is the residuum of a diaryl diamine having the structure:

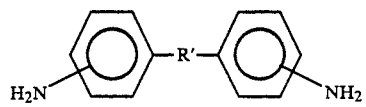

wherein R' is a divalent moiety independently selected from a covalent carbon to carbon bond, or R' is methylene, ethylene, propylene, isopropylene, hexafluoroisopropyliden, 1-phenyl-2,2,2-trifluoroethylidene, dichloro and difluoroalkylenes up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene up to 8 Si atoms; disiloxanylene, and a polysiloxanylene up to 8 Si atoms.

13. The polymer of claim 12 wherein R' is methylene.

14. The polymer of claim 12 wherein R' is oxygen.

15. The polymer of claim 12 wherein R' is hexafluoroisopropylidene.

16. The polymer of claim 1 produced from about 25 to about 100 mole percent of fluorine-containing monomers.

17. The polymer of claim 16 produced from about 50 to about 75 mole percent of fluorine-containing monomers.

18. The polymer of claim 1 in the form of a film.

* * * * *